United States Patent [19]

Hawley

[11] 4,091,121

[45] May 23, 1978

[54] METHOD FOR MAKING IMITATION MARGARINE

[75] Inventor: Robert Lyle Hawley, Chesterfield, Mo.

[73] Assignee: Ralston Purina Company, St. Louis, Mo.

[21] Appl. No.: 777,208

[22] Filed: Mar. 14, 1977

[51] Int. Cl.² ............................................. A23D 3/02
[52] U.S. Cl. ................................................. 426/603
[58] Field of Search ................................ 426/603, 604

[56] References Cited

U.S. PATENT DOCUMENTS

| | | | |
|---|---|---|---|
| 3,194,665 | 7/1965 | Pardun | 426/604 |
| 3,266,904 | 8/1966 | Duin et al. | 426/604 |
| 3,386,835 | 6/1968 | Schaap | 426/603 X |

*Primary Examiner*—Raymond N. Jones
*Assistant Examiner*—R. A. Yoncoskie
*Attorney, Agent, or Firm*—Veo Peoples, Jr.

[57] ABSTRACT

An imitation margarine product prepared from a water-in-oil emulsion containing vegetable protein isolates and particularly soy protein isolate, substituted for milk-derived or animal based protein, is prepared by a process which provides a substantially more stable product than like products, especially those containing vegetable protein.

3 Claims, No Drawings

METHOD FOR MAKING IMITATION MARGARINE

BACKGROUND OF THE INVENTION

This invention relates to a method of making a more stable low calorie imitation margarine product than is commercially available.

Most low calorie margarine-like spreads previously have contained casein. Casein, the protein of milk, is a natural ingredient of cheese, butter and margarine. However, in simulating a low-calorie margarine which contains more protein then normal, several problems have been encountered when the protein has been casein. When simulating such margarine formulations two phases are prepared separately, i.e., (1) a water phase containing the protein and (2) a fat or oil phase. The two phases must be mixed to form a water-in-oil emulsion. Casein, however has a strong oil-in-water forming ability which is particularly noticeable as the last of the water phase is added. U.S. Pat. No. 3,266,904 attempted to correct this problem by first forming an oil-in-water emulsion and then inverting the emulsion to the water-in-oil type. Alternatively, they offered a method for directly forming the water-in-oil emulsion by heating the water phase and injecting it into a pre-cooled oil phase. Notwithstanding this first problem an additional drawback was discovered. It was discovered that proteins generally and casein in particular could not be successfully employed in acid medium to form margarine emulsions owing to the coagulation of the protein. Accordingly, U.S. Pat. No. 3,386,835 offered, as an apparent improvement over U.S. Pat. No. 3,266,904, a process in which an acidogenic substance was utilized to form the emulsion at alkaline pH but would slowly turn acidic for the purpose of microbiological keepability. Vegetable protein has been treated in the literature as having the same problems as casein.

SUMMARY OF THE INVENTION

According to this invention a low-fat margarine spread, comprising a directly formed water-in-oil emulsion, has improved stability by employing soy protein isolate in a warm aqueous phase at acid pH and mixing such with a warm fat phase.

DETAILED DESCRIPTION OF THE PREFERRED EMBODIMENTS

In the process of this invention two separate phases are prepared, i.e., an aqueous phase and an oil or fat phase. The aqueous phase contains a neutral pH vegetable protein isolate, water and an acidifying agent to adjust the pH of the phase to a range of from pH 4.7 to pH 5.5. Lower pH than this will result in water break out of the margarine or syneresis and higher pH will lead to the formation of an oil in water emulsion. The oil phase may contain oil and/or fat, salt, coloring agents, stabilizers and/or emulsifying agents.

Vegetable protein used in this invention may be for example, isolates of cottonseed, rapeseed, flax seed, peanuts or preferably soybeans. A suitable starting material for the process is a soy protein isolate. Generally, the isolate is prepared by extraction of defatted soy flakes with alkali, followed by precipitation with acid at the isoelectric point pH 4.5. This process yields a process with 90% minimum protein on a moisture-free basis. Generally, these isoelectric isolates are solubilized with alkali at neutral pH of 6.6 to 7.0 but preferably pH 7. It is finally dried, as for example in a spray drier. Accordingly, it is preferred that alkali treatment occur prior to drying the isolate. The alkali treatment at pH 6.6 to 7.0 apparently serves to unwind the protein molecule which allows it to more fully rehydrate in the aqueous phase of the emulsion prior to the addition of an acid. The isolate is used in an amount of from 4 to 10% by weight the aqueous phase. The soy serves as a most effective emulsifier for a water in oil emulsion by undergoing a reduction in pH during the preparation of the aqueous phase. The pH reducing agent may be acids such as lactic acid, acetic acid, citric acid, hydrochloric acid or salt such as glucone delta lactones or other acidifying materials including microbial ferments.

The oil phase is prepared from any suitable fat or oil or blend having a SFI/melting index of from 0% to 20% at 92° F.

If desired, certain additives such as sodium steroyl 2-lactylate and distilled monoglycerides of both saturated and unsaturated fatty acids may be used to improve the stability of the system. They may be added in amounts of from 1 to 6% based on the weight of the oil phase. Other additives may be for example, poly sorbates or lecithin.

Both phases are heated to a temperature of from about 50° to 100° C, preferably from about 70°-90° C. The phases are mixed at ratios of aqueous phase to oil phase of from 40/60 to 60/40 without precooling the fat phase and without regard to which phase is added to which. The mixture is sufficiently agitated until the phases are dispersed. A water-in-oil emulsion is formed directly without the occurrence of phase inversion. The emulsion is kneaded and simultaneously cooled until it solidifies. The temperature of cooling will vary depending on the type of fat but will generally range from 3° to 17° C.

The present invention may be more fully illustrated by the following example. It should be understood that the examples are not intended to limit the scope of the invention but rather are merely set forth for illustrative purposes.

EXAMPLE I

An aqueous phase is prepared by dispersing in 470 parts of water, 30 parts of soy protein isolate and heating to 180° F. The mixture is treated with lactic acid to a pH of 5.3. An oil phase is prepared by mixing 193 parts of vegetable shortening, 2 parts of monoglyceride, 3 parts of sodium steroyl 2-lactylate and 2 parts of NaCl after the emulsifiers have dissolved. The oil phase is heated to 160° F. The oil phase is added to the aqueous and vigorously whipped. The mixture is cooled rapidly in an ice water bath and stored at 40° F. overnight.

The resulting margarine is of excellent quality showing good stability with no loss of oil or water upon slicing and good spreadability.

EXAMPLE II

The same procedure as Example I except casein is substituted for soy isolate resulted in a fluid product with a thick foamy texture more like mayonnaise than margarine.

What is claimed is:

1. In a method for making a stable imitation margarine spread, of the type having a water-in-oil emulsion prepared from an oil phase comprising from 40 to 60% by weight of the emulsion and an aqueous phase providing from 60 to 40% by weight of the emulsion said emulsion being kneaded and cooled to from 7° to 13° C; the improvement comprising:
  (a) preparing the aqueous phase at a pH of from 4.8 to 5.8 with from 4 to 10% by weight of the aqueous phase being a spray dried vegetable protein isolate having a pH of 6.6 to 7.0 prior to admixture with the aqueous phase;
  (b) preparing the emulsion from said aqueous phase and said oil phase heated at from 50° to 100° C;

whereby phase inversion to an oil-in-water emulsion and syneresis upon spreading are substantially inhibited and the need to form the emulsion at high pH is negated without employing animal protein.

2. The method of claim 1 wherein the vegetable protein isolate is soy protein isolate.

3. The method of claim 1 wherein the phases are heated at from about 70° to 90° C.

* * * * *